United States Patent Office 3,037,005
Patented May 29, 1962

3,037,005
POLYMERIC COMPOSITIONS
Glenn D. Cooper and Alfred R. Gilbert, Schenectady, N.Y., assignors to General Electric Company, a corporation of New York
No Drawing. Filed Nov. 25, 1958, Ser. No. 776,190
3 Claims. (Cl. 260—80)

This invention is concerned with solid high molecular weight homopolymers derived from vinyltrimethylsilane.

We have discovered that by employing a certain catalyst system we are able to obtain from the above vinyltrimethylsilane, solid, high-melting homopolymers which are highly crystalline, and which are useful in making fibers and films having good heat resistance and good electrical insulating characteristics. These crystalline materials retain their strength at higher temperatures than is possible for amorphous polymers presently obtained by other catalyst systems. The fact that we were able to obtain the solid, crystalline, high-melting homopolymers by using this particular catalyst system, was entirely unexpected and in no way could have been predicted since previous attempts to polymerize, for instance, allyltrimethylsilane, by conventional polymerization techniques yielded only lower molecular weight oils.

The crystalline homopolymers derived from vinyltrimethylsilane are obtained by heating this monomer in the presence of a catalyst system comprising a mixture of an aluminum alkyl (for example, aluminum triethyl, aluminum tributyl, etc.) in combination with a titanium compound advantageously in the form of a halide or a salt thereof, e.g., titanium trichloride, titanium tetrachloride, titanium tetraacetate, etc. The amount of catalyst mixture used is not critical and can be varied within reasonable limts, but advantageously is within the range of from 1 to 20 percent, by weight, based on the weight of the monomer being polymerized. The mixture of the aluminum alkyl and the titanium compound is preferably within a weight range of from about 0.1 to 5 parts of the aluminum alkyl per part of the titanium compound, for instance, the TiCl$_4$.

The polymerization reaction is advantageously carried out in the presence of a suitable inert solvent. Such a solvent may comprise a liquid hydrocarbon aliphatic solvent such as, for instance, n-heptane, mineral oil, etc.

In carrying out the reaction, the vinyltrimethylsilane is dissolved in a suitable solvent, the aluminum alkyl catalyst added, and the mixture heated at temperatures ranging from about 40 to 150° C., and thereafter the titanium compound is added, preferably in the form of a solution in an aliphatic hydrocarbon. After heating the mixture for from 1 to 10 hours or more, the polymer may be precipitated from the solvent by adding to the reaction mixture such materials as methanol and ethanol.

In order that those skilled in the art may better understand how the present invention may be practiced, the following examples are given by way of illustration and not by way of limitation. All parts are by weight.

Example 1

This example describes the preparation of vinyltrimethylsilane. Methyl magnesium bromide was prepared by mixing together 567 grams (23.3 mols) of magnesium turnings in 6 liters of anhydrous diethyl ether and introducing sufficient methyl bromide. To the Grignard reagent was added 1242 grams (7.76 mols) vinyltrichlorosilane in 1 liter of diethyl ether. Distillation was effected from the reaction mixture to yield about 4 liters of material at which point 1200 grams of ammonium chloride in 6 liters of water was added to the residue remaining after distillation. The ether layer was separated and combined with that which had been distilled. After drying over calcium chloride, the ether solution was subjected to rectification to give 543.7 grams of trimethylvinylsilane boiling at 55° C., and having a refractive index $n_D^{20}$ 1.3904–1.3908.

Further directions for preparing the vinyltrimethylsilane may be found in Journal of the American Chemical Society, vol. 72, page 1078 (1950); and in Journal of Organic Chemistry, vol. 17, page 1379 (1952).

Example 2

About 11.4 ml. of a 25% solution of aluminum triethyl in n-hexane was added under nitrogen to a solution of 32.1 grams of vinyltrimethylsilane and 100 ml. of n-heptane. The solution was stirred and warmed to 50° C.; a nitrogen blanket was maintained over the reaction mixture at all times. A solution of 1.1 ml. of titanium tetrachloride in 10 ml. of n-heptane was added, at which time the temperature rose rapidly to about 57° C. The mixture was then heated to 70° C. and maintained at this temperature for about 3 hours with stirring. The mixture was cooled and added to a large volume of methanol (about 1.5 liters) to precipitate the polymer. The solid polymer which was thus obtained by precipitation was filtered, washed with a solution of HCl in methanol and dried. This solid polymer was identified by analysis to be composed of the recurring structural units

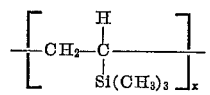

where $x$ is an integer greater than 1, for instance, from about 10 to 1,000 or more. Being of a hydrocarbon nature, it could be used for insulating electrical conductors by passing the metallic conductor through solutions of the latter polymer and heating the treated conductor at elevated temperatures to volatilize the solvent. This polymer is insoluble in trichloroethylene at room temperature but is soluble in the same solvent at elevated temperatures of about 100° C. or higher. The polymer is fusible at elevated pressures and temperatures, and at 120–130° C., it can be deformed without elastic memory.

It will, of course, be apparent to those skilled in the art that other conditions may be employed in making homopolymers of vinyltrimethylsilane. Temperatures of reaction may vary from about 50–150° C. or higher, and may be carried out at pressures ranging from somewhat below atmospheric pressure to elevated pressures as high as 5 to 50 atmospheres. The catalyst and catalyst concentration may be varied widely employing the usual so-called "Ziegler" type catalysts which are usually metallic alkyl catalysts in combination with accelerators therefor, such as the titanium tetrachloride employed in the previous examples. The time of heating the monomer may be varied widely and usually is of the order of about 30 minutes to 10–12 hours, or more, depending on the temperature used, the monomer employed, the particular catalyst system used in the reaction mixture, etc.

The compositions of the instant invention have various uses. The homopolymers can be molded to give sheets which have good strength and which can be employed for slot liners in motor insulation. In addition, some of the polymers, especially those which are highly crystalline, may be extruded from a melt or from a solution to give fibers which can be oriented to yield filaments of good strength. Alternatively, the homopolymers can be dissolved in suitable solments and metallic conductors can be passed through such solutions and heated to remove the solvent to give insulated conductors which have good electrical properties and good flexibility. The homopolymers, because of their high temperature resistance, are especially suitable for insulation purposes where high gradients of temperature may be encountered.

The homopolymers of our invention can be treated with strong acids, such as sulfuric acid, aluminum chloride and HCl, etc., to cleave some of the Si-C bonds and substitute a hydrolyzable group on the silicon, for instance, chlorine, the sulfate radical, etc. These hydrolyzable polymeric silicon compositions can then be hydrolyzed with other organochlorosilanes or equilibrated with organopolysiloxanes to give block homopolymers containing polysiloxane units and units derived from our described homopolymers, such block polymers having segments in which the polymer chain is composed of C-C linkages and other segments composed of Si-O-Si linkages.

It will, of course, be apparent to those skilled in the art that our above-identified compositions can be mixed with various other materials including various fillers (e.g., silica, carbon black, titanium dioxide, diatomaceous earth, etc.), plasticizers, pigments, stabilizers (both heat and light stabilizers, etc.).

What we claim as new and desire to secure by Letters Patent of the United States is:

1. Homopolymeric vinyltrimethylsilane being solid at room temperature.
2. The process for polymerizing vinyltrimethylsilane to obtain a solid polymer which comprises heating the aforesaid vinyltrimethylsilane in a solvent in the presence of a mixed catalyst system composed of an aluminum trialkyl and a titanium compound selected from the class consisting of titanium tetrachloride, titanium trichloride and titanium tetraacetate.
3. The process as in claim 2 in which the aluminum trialkyl is aluminum triethyl and the titanium compound is titanium tetrachloride.

References Cited in the file of this patent

Sommer et al.: Journal of the American Chemical Society, vol. 70, pages 2872–2874, September 1948. (Copy in Patent Office Sci. Lib.)

Polyakova et al.: Chemical Abstracts, vol. 51, page 4979 (1957). (Copy in Sci. Lib.)

Stille: Chemical Reviews, vol. 58, pages 556–558, June 1958. (Copy in Sci. Lib.)

Natta et al.: J. of Polymer Science, vol. 31, No. 122 (August 1958), pp. 181–183. (Copy in Div. 60.)

Chemical Reviews, vol. 56, No. 6, December 1956, pp. 1075 and 1089. (Copy in Sci. Lib.)